(12) United States Patent
Fujita et al.

(10) Patent No.: US 7,857,653 B2
(45) Date of Patent: Dec. 28, 2010

(54) COVER OPENING AND CLOSING DEVICE WITH AN INTEGRAL TURN REGULATING PORTION

(75) Inventors: Shinji Fujita, Osaka (JP); Syuji Yasuoka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/708,961

(22) Filed: Feb. 19, 2010

(65) Prior Publication Data
US 2010/0227485 A1    Sep. 9, 2010

(30) Foreign Application Priority Data
Mar. 4, 2009    (JP) .............................. 2009-050965

(51) Int. Cl.
*H01R 13/62* (2006.01)
(52) U.S. Cl. ..................................... 439/367
(58) Field of Classification Search ................. 439/367, 439/136; 312/327
See application file for complete search history.

(56) References Cited

U.S. PATENT DOCUMENTS

| | | | | |
|---|---|---|---|---|
| 4,947,583 A | * | 8/1990 | Inui et al. ..................... | 49/193 |
| 5,368,500 A | * | 11/1994 | Dedering ..................... | 439/367 |
| 6,060,700 A | * | 5/2000 | Perlman et al. ............. | 219/679 |
| 6,966,791 B1 | * | 11/2005 | Farr ............................ | 439/367 |
| 2002/0124738 A1 | * | 9/2002 | Lee ............................... | 99/468 |
| 2010/0071159 A1 | * | 3/2010 | Myung ......................... | 16/303 |

FOREIGN PATENT DOCUMENTS

JP    2002-190349 A    7/2002

* cited by examiner

*Primary Examiner*—Chandrika Prasad
(74) *Attorney, Agent, or Firm*—Hamre, Schumann, Mueller & Larson, P.C.

(57) ABSTRACT

In the cover opening and closing device of the present invention, a terminal cover 21 includes a turn regulating portion 24. The turn regulating portion 24 can prevent the terminal cover 21 from turning in a cover closing direction due to resilience of coupling portions 22 and 23 when the terminal cover 21 is moved to a cover opening position. Thus, when connecting a cable to a terminal, the terminal cover 21 does not hinder the connection, so that the cable can be connected to the terminal with ease. It is possible to achieve a configuration of holding the terminal cover capable of opening and closing the terminal open with ease and at low cost.

5 Claims, 10 Drawing Sheets

COVER OPENING AND CLOSING DEVICE WITH AN INTEGRAL TURN REGULATING PORTION

BACKGROUND OF INVENTION

1. Field of the Invention

The present invention relates to a cover opening and closing device capable of opening and closing terminals and the like.

2. Description of Related Art

In recent years, signal terminals and a power terminal provided on such mobile devices as a mobile phone terminal and a digital still camera are, in many cases, covered with a cover to avoid the adherence of moisture, dust, etc. JP 2002-190349 A discloses a terminal cover capable of opening and closing a terminal provided on an end portion of a cabinet of a mobile phone terminal. The terminal cover disclosed in JP 2002-190349 A is coupled to the body of the phone through a belt-shaped coupling portion.

In reference to the terminal cover disclosed in JP 2002-190349 A, it is necessary to bend the coupling portion to open the terminal cover when connecting a cable or the like to the terminal (see FIG. 14 of the publication). However, when a user lets go of the terminal cover in the state shown in FIG. 14 of the publication, the terminal cover moves to the front side of the terminal as shown in FIG. 13 of the publication due to the resilience of the coupling portion. When the terminal cover moves to the front side of the terminal, it hinders the user from connecting the cable. Thus, at the time of connecting the cable to the terminal, it is necessary for the user to hold the terminal cover open with one hand and connect the cable to the terminal with the other hand. In other words, since the user has to use his both hands to connect the cable, the operability is compromised.

SUMMARY OF THE INVENTION

The cover opening and closing device of the present invention includes; a cabinet; and a cover turnably supported against the cabinet and capable of opening and closing a portion of the cabinet to be covered. The cover includes a turn regulating portion capable of preventing the cover, when the cover is at a position for opening the portion to be covered, from turning in a cover closing direction.

According to the present invention, since the cover can be held open, it is possible to improve the accessibility to the portion to be covered.

DETAILED DESCRIPTION OF THE INVENTION

Figure 1:
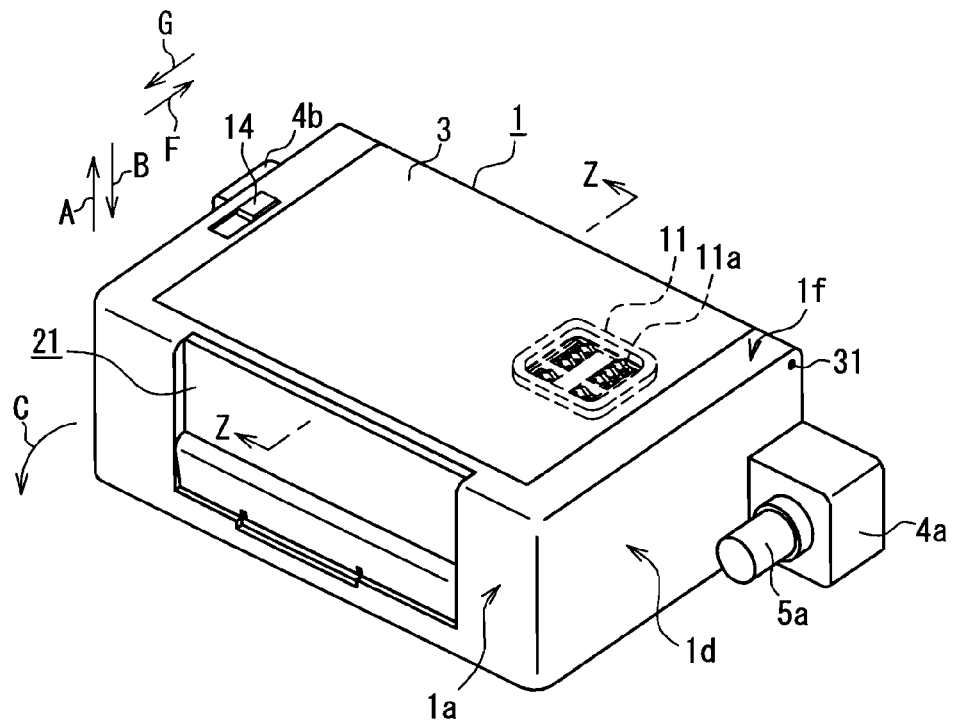
FIG. 1 is a perspective view showing the appearance (front side) of a card mounting apparatus provided with a cover opening and closing device according to Embodiment 1.

In the cover opening and closing device of the present invention, the turn regulating portion may be formed integrally with the cover. By having such a configuration, the cover opening and closing device can be achieved from a small number of components, which results in cost reduction.

In the cover opening and closing device of the present invention, the turn regulating portion may include a cover closing regulating surface that, when the cover is at the position for opening the portion to be covered, comes into surface-to-surface contact with a surface of the cabinet so as to prevent the cover from turning in the cover closing direction. By having such a configuration, the cover can be fixed at the cover opening position. Consequently, it is possible to improve the accessibility to the surface of the portion to be covered opposing the cover or to the inside of the portion to be covered.

In the cover opening and closing device of the present invention, the turn regulating portion may include a cover opening regulating surface that, when the cover is at a position for closing the portion to be covered, comes into surface-to-surface contact with a surface of the cabinet so as to prevent the cover from turning in a cover opening direction. By having such a configuration, it is possible to prevent, when the cover is at the cover closing position, the cover from turning in the cover opening direction by its own weight or resilience that develops around the shaft for turnably supporting the cover against the portion to be covered.

In the cover opening and closing device of the present invention, the turn regulating portion may include; a cover closing regulating surface that, when the cover is at the position for opening the portion to be covered, comes into surface-to-surface contact with a surface of the cabinet so as to prevent the cover from turning in the cover closing direction; a cover opening regulating surface that, when the cover is at a position for dosing the portion to be covered, comes into surface-to-surface contact with the surface of the cabinet so as to prevent the cover from turning in a cover opening direction; and a convex boundary portion formed between the cover dosing regulating surface and the cover opening regulating surface. By having such a configuration, the cover can be fixed at the cover opening position. Consequently, it is possible to improve the accessibility to the surface of the portion to be covered opposing the cover or to the inside of the portion to be covered. Further, it is possible to prevent, when the cover is at the cover dosing position, the cover from turning in the cover opening direction by its own weight or resilience that develops around the shaft for turnably supporting the cover against the portion to be covered.

In the cover opening and dosing device of the present invention, the portion to be covered may be provided with a terminal to which a communication cable can be connected, and an opening angle of the cover relative to the cabinet when the cover is at the position for opening the portion to be covered is an angle that allows a space between the cover and the communication cable connected to the terminal. By having such a configuration, the cover does not come into contact with the cable connected to the terminal. Thus, it is possible to remove the cable from the terminal with ease. Further, since a load is not applied to the cable, it is possible to prevent the occurrence of poor connection between a cable and a terminal or between a cable terminal and the terminal provided on the covered portion.

Embodiment 1

[1. Configuration of Card Mounting Apparatus]

A card mounting apparatus will be described in Embodiment 1 as an example of a piece of equipment provided with the cover opening and dosing device. To/from the card mounting apparatus, a card medium such as a smart card can be attached/detached. The card mounting apparatus can be connected to information equipment such as a personal computer. The application of the cover opening and dosing device according to Embodiment 1 is not limited to the card mounting apparatus, and the cover opening and dosing device is also useful as a terminal cover provided on such mobile devices such as a personal computer, a digital still camera and a mobile phone terminal. Further, terminals are not the only things that the cover opening and dosing device according to Embodiment 1 can cover, and other devices such as a card slot also may be covered with the cover opening and dosing device.

Figure 2:
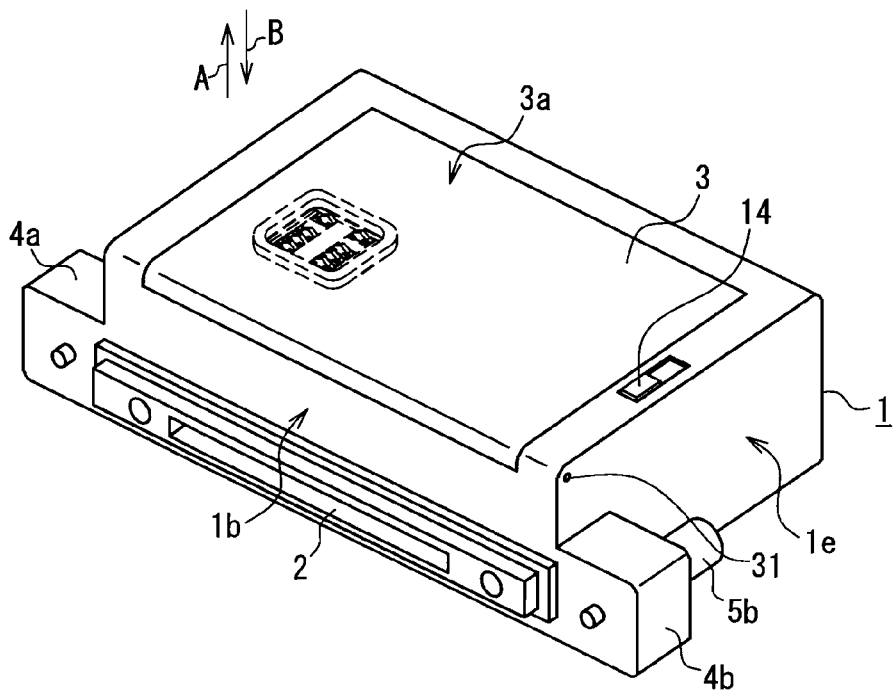
FIG. 2 is a perspective view showing the appearance (back side) of the card mounting apparatus provided with the cover opening and closing device according to Embodiment 1.
Figure 3:
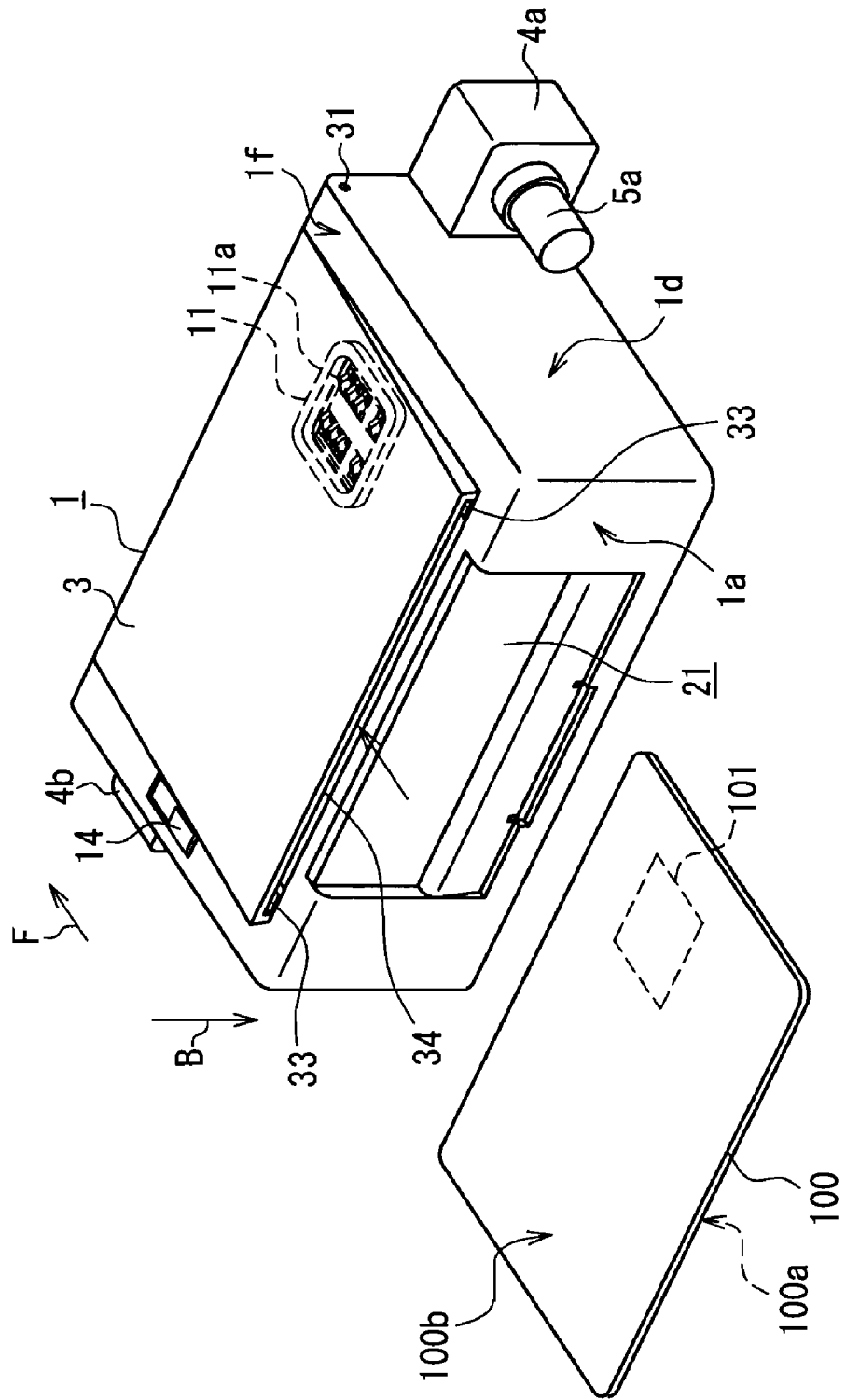
FIG. 3 is a perspective view showing a smart card and the card mounting apparatus.

FIG. 1 is a perspective view showing the appearance (front side) of the card mounting apparatus provided with the cover opening and closing device according to Embodiment 1. FIG. 2 is a perspective view showing the appearance (back side) of the card mounting apparatus provided with the cover opening and dosing device according to Embodiment 1. FIG. 3 is a perspective view showing a state in which the card cover of the card mounting apparatus is open.

As shown in FIGS. 1 and 2, the card mounting apparatus includes a substantially rectangular parallelepiped cabinet 1 in which electric circuit components are included. As shown in FIG. 2, a connector 2 connectable to a variety of information processing devices such as a personal computer 50 (which will be described later with reference to FIG. 8) is provided on the back surface 1b of the cabinet 1. A rib 4a for supporting a screw 5a is formed on the right side surface 1d of the cabinet 1. The rib 4a sticks out from the right side surface 1d. Note that the right side surface 1d is a side surface that comes to the right side of a user when the card mounting apparatus is positioned in such a manner that the front surface 1a faces the user and an inner surface 1c faces upward. A rib 4b for supporting a screw 5b is formed on the left side surface 1e of the cabinet 1. The rib 4b sticks out from the left side surface 1e. Note that the left side surface 1e is the back surface of the right side surface 1d. The screws 5a and 5b can be screwed to screw holes (not shown) formed in the personal computer 50 (will be described later). Further, a card cover 3 and a lock lever 14 are provided on the upper surface 1f of the cabinet 1. Note that the upper surface 1f is a surface adjacent to the front surface 1a, the back surface 1b, the right side surface 1d and the left side surface 1e.

The card cover 3 is primarily composed of a substantially plate-shaped component having a rectangular main plane. The main plane of the substantially plate-shaped component of the card cover 3 is at least larger than the main plane of a smart card 100 (see FIG. 3) in area. The card cover 3 is supported against the cabinet 1 by a shaft 31 in the vicinity of one of the longer sides of the substantially plate-shaped component. The card cover 3 is turnable about the shaft 31 in the directions indicted by the arrows A and B. The card cover 3 is movable to a dosing position and a cover opening position. The dosing position is a position for dosing a card mounting portion in the cabinet 1. The cover opening position is a position for opening the card mounting portion in the cabinet 1. FIGS. 1 and 2 show a state in which the card cover 3 is at the dosing position. FIG. 3 shows a state in which the card cover 3 is at the cover opening position.

Between the pair of front and back main planes of the card cover 3, the main plane that opposes the card mounting portion of the cabinet 1 (hereinafter referred to as "the back surface of the card cover 3") is provided with a pair of card holding portions 33 (see FIG. 3). The card holding portions 33 can hold the smart card 100 (will be described later). The card holding portions 33 are formed respectively in the vicinity of the both ends of the back surface of the card cover 3, and they stick out from the back surface. The card holding portions 33 are substantially L-shaped in cross section. The card holding portions 33 are formed along the short sides of the card cover 3. An opening 34 into which the smart card 100 can be inserted is formed in the card cover 3 between the pair of card holding portions 33. The width of the opening 34 is at least larger than the size of the smart card 100 in the longitudinal direction.

The lock lever 14 is slidable in the directions indicated by the arrows F and G. The lock lever 14 is in engagement with a lug (not shown) formed on the card cover 3 when it is at the position shown in FIGS. 1 and 2. At this time, the card cover 3 is fixed at the dosing position. When the lock lever 14 is at the position shown in FIG. 3, it is disengaged from the lug (not shown) formed on the card cover 3. At this time, the card cover 3 is in a turnable state.

On the portion of the cabinet 1 covered with the card cover 3, a contact terminal portion 11 is provided. The contact terminal portion 11 includes a plurality of contact terminals 11a. The contact terminals 11a each are composed of substantially plate-shaped metal having resilience. As same as the number of contact areas of a terminal 101 on the smart card 100, in Embodiment 1, the number of the contact terminals 11a is eight.

As shown in FIG. 3, in regard to the smart card 100, its physical and electrical properties are set on the basis of ISO (International Organization for Standard) 7816. JIS (Japan Industrial Standards) X 6303 also specifies the physical properties of the smart card 100 and the position and the dimensions of the external terminal. The smart card 100 is compatible with these standards. For example, the smart card 100 has a width of about 95 mm, a depth of about 54 mm and a thickness of about 0.5 to 1.0 mm. The smart card 100 includes an IC (integrated circuit) chip. The terminal 101 is provided on at least one of the main surfaces 100a of the smart card 100. The terminal 101 is connected electrically to the IC chip. There are IC chips capable of storing a variety of information such as security information and of performing arithmetic processing. JIS X 6303 also specifies the position and the dimensions of the terminal 101. The positions and the dimensions of the contact terminal portion 11 and the contact terminals 11a are determined so that the card mounting apparatus becomes compatible with the smart cards based on the standard.

The smart card 100 can be inserted into the card mounting apparatus by placing the smart card 100 into the opening 34 in a state where the terminal 101 is positioned on the right side and the main surface 100a opposes the contact terminal portion 11. The smart card 100 placed into the opening 34 is held by the card cover 3 while its position being regulated by the card holding portions 33.

Next, by turning the card cover 3 about the shaft 31 in the direction indicated by the arrow B, the card cover 3 moves to the dosing position shown in FIGS. 1 and 2 while holding the smart card 100.

Then, by sliding the lock lever 14 in the direction indicated by the arrow F from the position shown in FIG. 3 in a state where the card cover 3 is moved to the dosing position, the card cover 3 can be fixed at the dosing position.

Through the above-described operations, mounting of the smart card 100 completes. By turning the card cover 3 to the dosing position, the contact terminals 11a of the contact terminal portion 11 and the terminal 101 come into contact with each other and are connected to each other electrically.

[2. Configuration of Cover Opening and Closing Device]

As shown in FIG. 1, a terminal cover 21 is provided on the front surface 1a of the cabinet 1. The terminal cover 21 is turnable between a cover dosing position shown in FIG. 1 and a cover opening position shown in FIG. 4.

Figure 4:
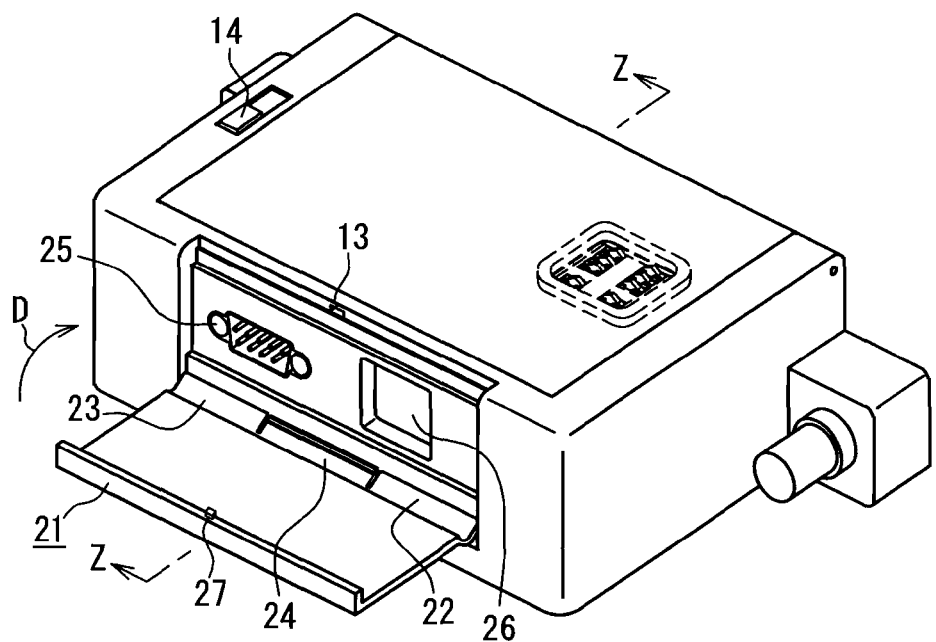
FIG. 4 is a perspective view showing the card mounting apparatus in a state where a terminal cover is open.

As shown in FIG. 4, the terminal cover 21 can open and close a serial terminal 25 and a LAN terminal 26 provided on the cabinet 1. Note that the serial terminal 25 and the LAN terminal 26 are examples of the terminals that the terminal cover 21 can open and dose. The terminal cover 21 is a substantially plate-shaped component having a substantially rectangular main plane. On one of the long sides of the terminal cover 21 opposing each other, coupling portions 22 and 23 and a turn regulating portion 24 are formed integrally. The terminal cover 21 is preferably made of a resin material with elastic deformability, such as hard rubber.

The coupling portions 22 and 23 are portions that support the terminal cover 21 turnably against the cabinet 1. At least some part of the coupling portions 22 and 23 is formed thin so as to have flexibility. The terminal cover 21 is turnable in the directions indicated by the arrows C and D while deforming the coupling portions 22 and 23. Although the coupling portions 22 and 23 are fixed to the cabinet 1 with screws or the like in Embodiment 1, they may be fixed to the cabinet 1 using an engagement means such as hook engagement.

The turn regulating portion 24 can prevent the terminal cover 21 from turning in the cover opening direction (the direction indicated by the arrow C) when the terminal cover 21 is located at the cover closing position shown in FIG. 1. The turn regulating portion 24 can prevent the terminal cover 21 from turning in the cover dosing direction (the direction indicated by the arrow D) when the terminal cover 21 is located at the cover opening position shown in FIG. 4. The turn regulating portion 24 is formed such that its end can come into contact with the cabinet 1.

Figure 5A:
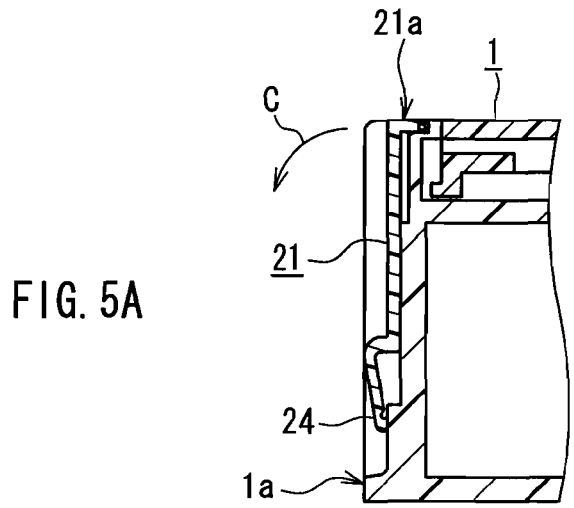
FIG. 5A is a cross-sectional view taken along a line Z-Z in FIG. 1, showing a main part.
Figure 5B:
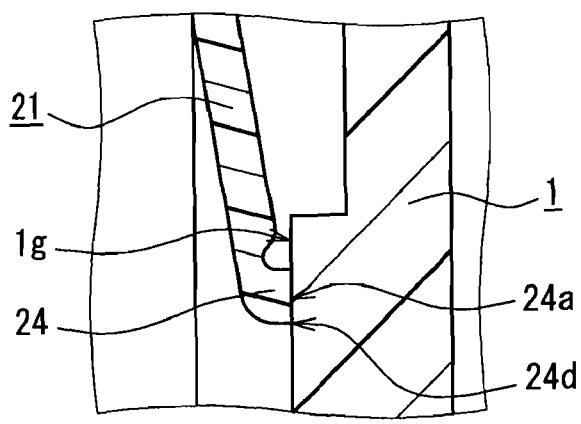
FIG. 5B is a cross-sectional view showing a main part in the vicinity of a turn regulating portion in FIG. 5A.

FIG. 5A is a cross-sectional view taken along the line Z-Z in FIG. 4, only showing a main part in the vicinity of the terminal cover 21 when the terminal cover 21 is at the cover dosing position. FIG. 5B is a cross-sectional view showing a main part in the vicinity of the turning regulating portion 24 in FIG. 5A. As shown in FIG. 5B, when the terminal cover 21 is at the cover dosing position, a first regulating surface 24a of the turn regulating portion 24 is in contact with an inner surface 1g of the cabinet 1. In turning the terminal cover 21 in the arrow C direction, a boundary portion 24d provided on the turn regulating portion 24 between the first regulating surface 24a and a third regulating surface 24c catches on the inner surface 1g of the cabinet 1. Thus, the terminal cover 21 is prevented, when it is dosed as shown in FIG. 5A, from turning in the direction indicated by the arrow C by its own weight.

In Embodiment 1, a concave portion 13 is formed in the cabinet 1 and a convex portion 27 is provided on the terminal cover 21, and the convex portion 27 engages with the concave portion 13 when the terminal cover 21 is at the cover dosing position. Because of such a configuration, it is possible to prevent the terminal cover 21 from turning in the direction indicated by the arrow C with more certainty when the terminal cover 21 is at the cover dosing position.

To shift the terminal cover 21 from the dosed cover state to the open cover state, a finger is put on an upper end portion 21a of the terminal cover 21 shown in FIG. 5A and it is drawn in the direction indicated by the arrow C. The terminal cover 21 starts turning in the direction indicated by the arrow C while being supported by the coupling portions 22 and 23 (see FIG. 4).

Figure 6A:
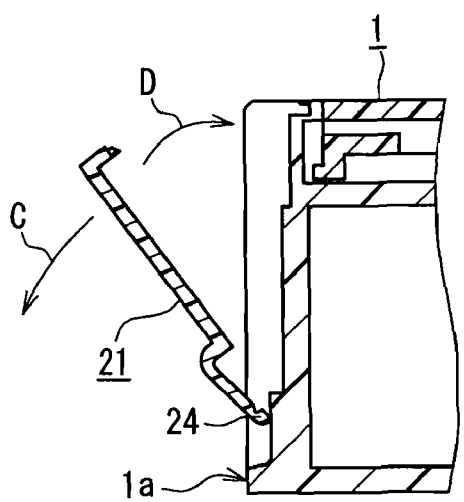
FIG. 6A is a cross-sectional view showing a main part of the card mounting apparatus in a state where the terminal cover is halfway open.
Figure 6B:
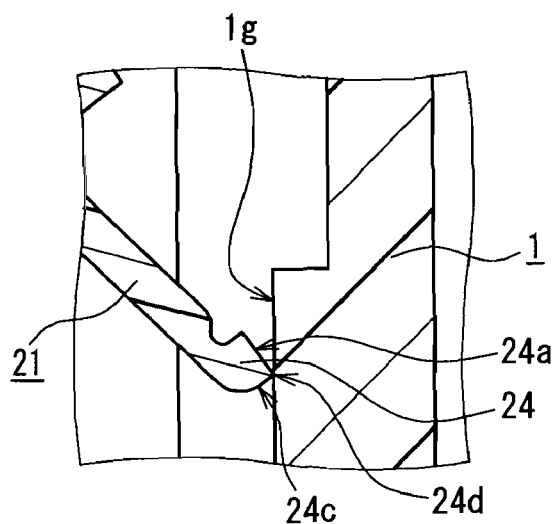
FIG. 6B is a cross-sectional view showing a main part in the vicinity of the turn regulating portion in FIG. 6A.

FIG. 6A is a cross-sectional view taken along a line Z-Z in FIG. 4, only showing a main part in the vicinity of the terminal cover 21 when the terminal cover 21 is at a position between the cover dosing position and the cover opening position. FIG. 6B is a cross-sectional view showing a main part in the vicinity of the turn regulating portion 24 in FIG. 6A. When the terminal cover 21 is turned to the position shown in FIG. 6A, the first regulating surface 24a of the turn regulating portion 24 and the inner surface 1g of the cabinet 1 become apart from each other as shown in FIG. 6B. When the terminal cover 21 is further turned in the arrow C direction, the boundary portion 24d catches on the inner surface 1g of the cabinet 1. When the terminal cover 21 is further turned in the direction indicated by the arrow C, it reaches the state shown in FIG. 7A.

Figure 7A:
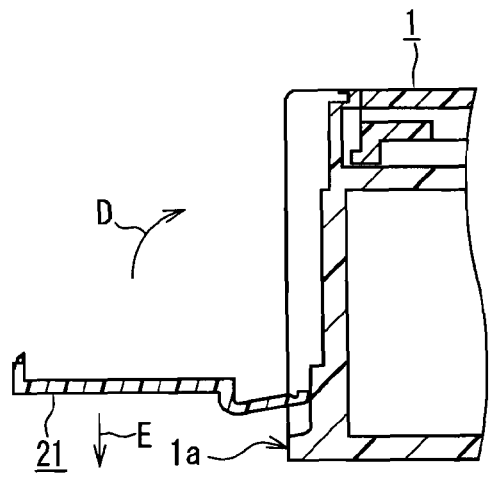
FIG. 7A is a cross-sectional view taken along a line Z-Z in FIG. 4, showing a main part.
Figure 7B:
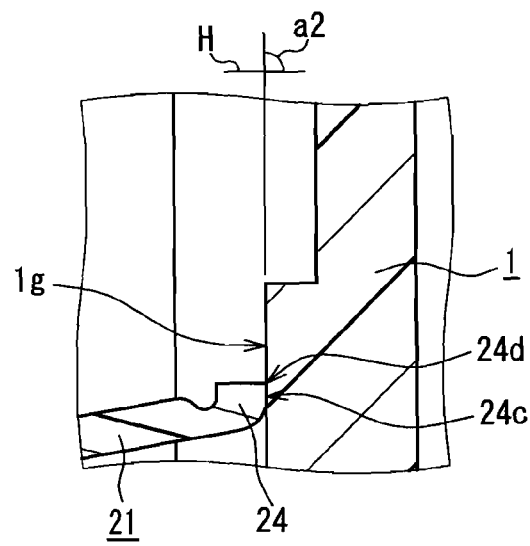
FIG. 7B is a cross-sectional view showing a main part in the vicinity of the turn regulating portion in FIG. 7A.

FIG. 7A is a cross-sectional view taken along a line Z-Z in FIG. 4, only showing the main part in the vicinity of the terminal cover 21 when the terminal cover 21 is at the cover opening position. FIG. 7B is a cross-sectional view showing the main part in the vicinity of the turn regulating portion 24 in FIG. 7A As shown in FIG. 7B, when the terminal cover 21 is at the cover opening position, the third regulating surface 24c of the turn regulating portion 24 is in contact with the inner surface 1c of the cabinet 1. Consequently, the terminal cover 21 is prevented from turning in the direction indicated by the arrow D, and the terminal cover 21 can be fixed at the cover opening position. At this time, resilience in the direction indicated by the arrow D which forces the coupling portions 22 and 23 to return to their original shapes (see FIG. 7A) develops in the coupling portions 22 and 23. However, since the third regulating surface 24c is in contact with the inner surface 1c and the boundary portion 24d has to catch on the inner surface 1g to turn the terminal cover 21 in the direction indicated by the arrow D, the terminal cover 21 is prevented from turning in the direction indicated by the arrow D.

When the terminal cover 21 is open as shown in FIGS. 7A and 7B, a user can attach/detach a serial cable to/from the serial terminal 25 (see FIG. 4) or attach/detach a LAN cable to/from the LAN terminal 26 (see FIG. 4). At this time, the terminal cover 21 is fixed in the open state where the terminals are fully open. Thus, the terminal cover 21 does not hinder the user from connecting a cable to one of the terminals, so that the cable can be attached/detached to/from the terminal with ease.

Figure 7C:
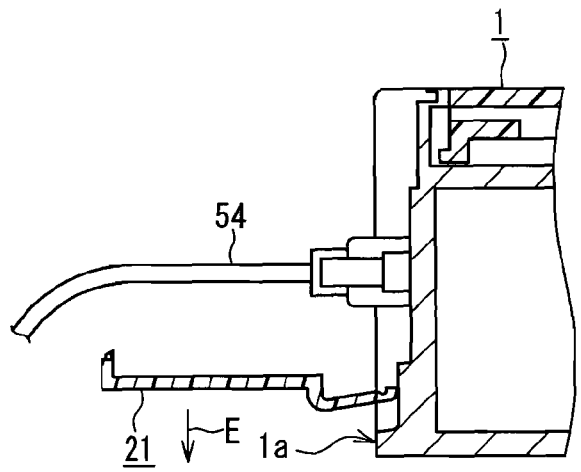
FIG. 7C is a cross-sectional view showing a main part in a state where a cable is connected.

FIG. 7C is a cross-sectional view showing a main part in a state where a serial cable 54 is connected to the serial terminal 25 (see FIG. 4). As shown in FIG. 7C, in the state where the serial cable 54 is connected to the serial terminal 25 (see FIG. 4) provided on the cabinet 1, the serial cable 54 and the terminal cover 21 are apart from each other. Thus, the serial cable 54 can be removed easily from the serial terminal 25 (see FIG. 4). Further, in the state where the serial cable 54 is connected to the serial terminal 25 (see FIG. 4), a load is not applied to the serial cable 54 from directions other than the attaching/detaching directions. Thus, it is possible to prevent the occurrence of a poor connection between the terminal and the cable.

When shifting the terminal cover 21 from the open state shown in FIGS. 7A and 7B to the closed state, the terminal cover 21 is turned in the direction indicated by the arrow D from the state shown in FIGS. 7A and 7B. At this time, since the third regulating surface 24c of the turn regulating portion 24 is in contact with the inner surface 1g of the cabinet 1 and the boundary portion 24d has to catch on the inner surface 1g, a turning load develops. However, when the terminal cover 21 is turned to a predetermined angle, the third regulating surface 24c slightly and elastically deforms, and thereby the terminal cover 21 can be shifted to the state shown in FIGS. 6A and 6B.

By further turning the terminal cover 21 in the direction indicated by the arrow D from the state shown in FIGS. 6A and 6B to move the terminal cover 21 to the position shown in FIGS. 5A and 5B, the serial terminal 25 and the LAN terminal 26 (see FIG. 4) can be covered with the terminal cover 21. At this time, the first regulating surface 24a of the turn regulating portion 24 is in contact with the inner surface 1g of the cabinet 1. Thus, in the closed cover state shown in FIG. 5A, the terminal cover 21 is prevented from turning in the direction indicated by the arrow C by its own weight.

Furthermore, by engaging the convex portion 27 (see FIG. 4) with the concave portion 13 (see FIG. 4) of the cabinet 1, the terminal cover 21 can be fixed at the cover closing position.

[3. Configuration of Information Processing Device]

Figure 8:
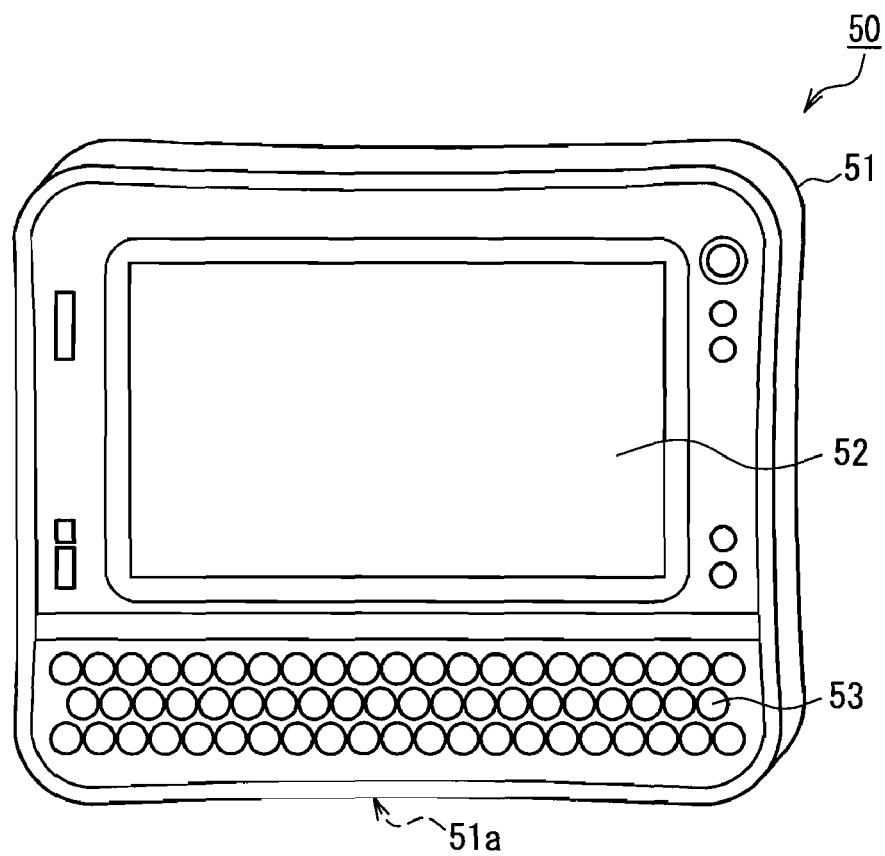
FIG. 8 is a perspective view showing a personal computer as an example of an information processing device to/from which the card mounting apparatus can be attached/detached.
Figure 9:
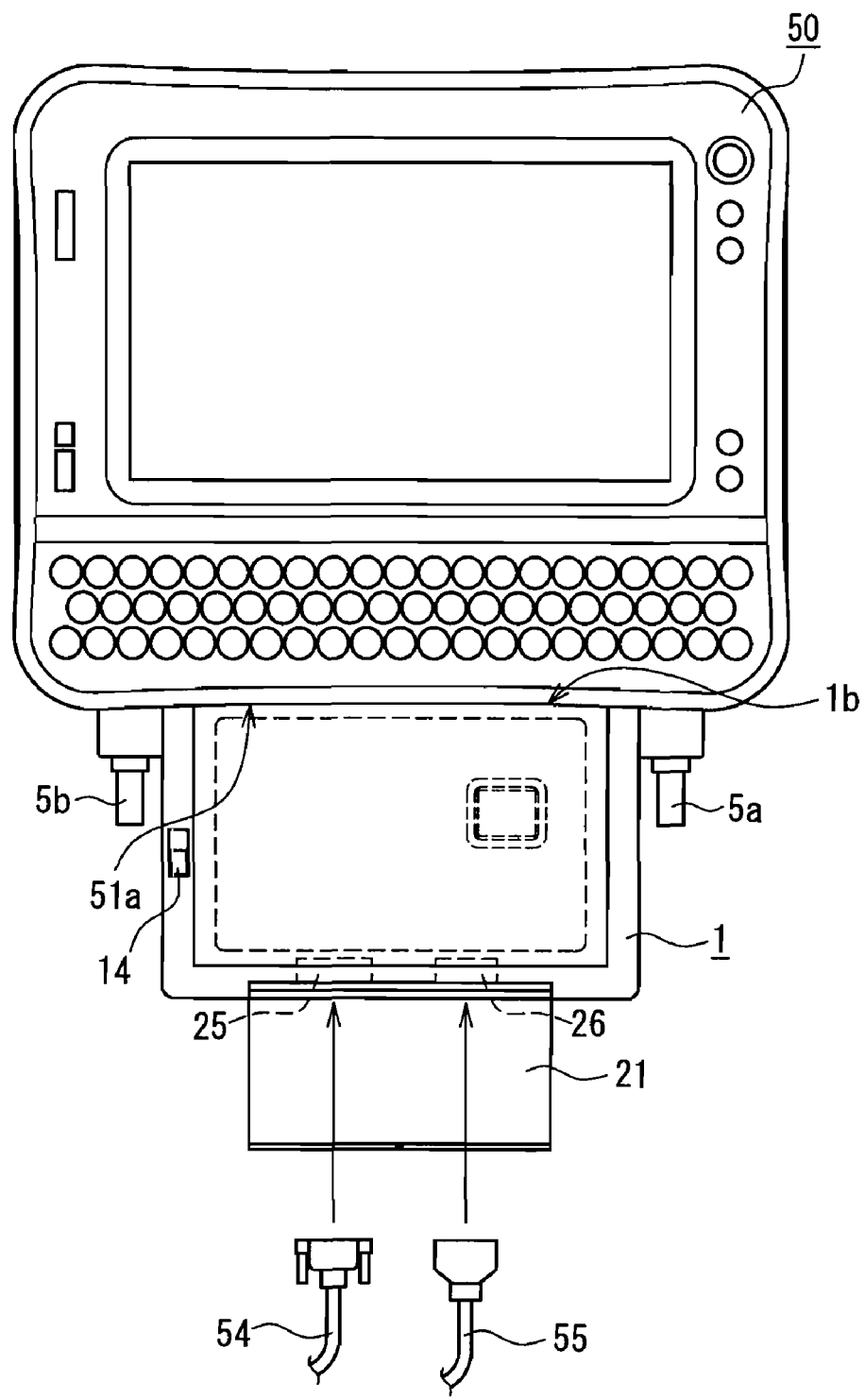
FIG. 9 is a plan view showing a state in which the card mounting apparatus is attached to the personal computer.

FIG. 8 is a perspective view showing a personal computer to/from which the card mounting apparatus in Embodiment 1 can be attached/detached. The personal computer shown in FIG. 8 is an example information processing device to/from which the card mounting apparatus can be attached/detached. FIG. 9 is a plan view showing a state in which the card mounting apparatus is attached to the personal computer. The card mounting apparatus provided with the cover opening and closing device according to Embodiment 1 can be attached/detached to/from an information processing device such as the personal computer shown in FIG. 8.

As shown in FIG. 8, the personal computer 50 is provided with a substantially rectangular parallelepiped cabinet 51 in which a central processing unit, a storage medium, etc. are included. The personal computer 50 includes, on a main plane of the cabinet 51, a display 52 capable of displaying a variety of information such as images. On the surface of the cabinet 51 where the display 52 is provided, an operation portion 53 with which a user can input a variety of information is provided. On a side surface 51a of the cabinet 51, a connecter (not shown) electrically connectable to the connecter 2 (see FIG. 2) of the card mounting apparatus is provided. The screw holes (not shown) into which the screws 5a and 5b can be screwed are formed in the side surface 51a.

As shown in FIG. 9, by making the back surface 1b of the card mounting apparatus and the side surface 51a of the personal computer 50 oppose each other, connecting the connectors to each other and screwing the screws 5a and 5b into the screw holes (not shown) formed in the side surface 51a of the cabinet 51, it is possible to mechanically attach the card mounting apparatus to the personal computer 50 and to electrically connect the connectors to each other. By electrically connecting the card mounting apparatus and the personal computer 50 to each other, the personal computer 50 and the card mounting apparatus 50 can exchange information with each other. For example, by mounting on the card mounting apparatus the smart card 100 (see FIG. 5) including an IC chip with a storage area, and operating the personal computer 50, information can be read from the IC chip on the smart card 100 and information can be written on the IC chip. Further, when the smart card 100 is a card used in a security system for authentication, by reading authentication information from the IC chip on the smart card 100 through the personal computer 50, authentication operations can be performed on the personal computer 50.

Further, as shown in FIG. 4, the card mounting apparatus is provided with the serial terminal 25 and the LAN terminal 26. Thus, by electrically attaching the card mounting apparatus to the personal computer 50 as shown in FIG. 9 and connecting the serial cable 54 to the serial terminal 25, the personal computer 50 can communicate with other devices serially. Further, by electrically attaching the card mounting apparatus to the personal computer 50 and connecting the LAN cable 55 to the LAN terminal 26, the personal computer 50 can be connected to a LAN.

[4. Effects of Embodiment, etc.]

According to the cover opening and closing device according to Embodiment 1, as a result of providing the turn regulating portion 24 on the terminal cover 21, the terminal cover 21 can be prevented from turning in the cover closing direction by the resilience of the coupling portions 22 and 23 when the terminal cover 21 is moved to the cover opening position. Thus, when connecting a cable to one of the terminals, the terminal cover 21 does not hinder a user from connecting the cable. Consequently, it is possible to connect the cable to the terminal with ease.

Further, since there is no need for the cover opening and closing device to include separate components such as a leaf spring and a stopper to fix the terminal cover 21 at the cover opening position, it can be achieved from a small number of components at low cost.

Further, as shown in FIG. 7C, since the terminal cover 21 is spaced from the cable in the state where the cable is connected to the terminal, no load is applied to the cable. As a result, it is possible to prevent the occurrence of poor connection between the terminal and the cable, for example. Furthermore, there is also an advantage that the cable easily can be removed from the terminal.

Further, since the first regulating surface 24a of the turn regulating portion 24 comes into contact with the inner surface 1g of the cabinet 1 when the terminal cover 21 is at the cover closing position, it is possible to prevent the terminal cover 21 from turning in the cover opening direction by its own weight. Consequently, since the terminal cover 21 does not open unexpectedly, it is possible to prevent the adherence of foreign matters, such as moisture and dust, to the terminals that the terminal cover 21 can cover.

Although the terminal cover 21 covers the serial terminal 25 and the LAN terminal 26 in the present embodiment, these terminals are examples. The terminals that the terminal cover 21 can cover may be a USB terminal to which a USB cable can be connected and a power terminal to which a power cable can be connected.

Although the terminal cover 21 capable of covering terminals has been described as an example of the cover of the present invention, the portion to be covered with the cover is not limited to terminals. Even when the portion to be covered is a memory card slot to/from which a memory card can be attached/detached or a battery slot to/from which a battery can be attached/detached, effects similar to those in Embodiment 1 can be achieved.

Further, by adjusting the angle of the inner surface 1g of the cabinet 1 and the angle of the surface of the terminal cover 21 that comes into contact with the inner surface 1g when opening the cover, the cover opening angle when the terminal cover 21 is at the cover opening position can be adjusted to any given angle. That is, a line segment H in FIG. 7B is parallel to the upper surface 1a of the cabinet 1. By setting an angle a2 of the inner surface 1g relative to the line segment H to any given angle, the cover opening angle of the terminal cover 21 can be set to any given angle. By increasing the angle a2, the cover opening angle of the terminal cover 21 can be increased. Further, by reducing the angle a2, the cover opening angle of the terminal cover 21 can be reduced.

Embodiment 2

A cover opening and closing device according to Embodiment 2 is different from the cover opening and closing device according to Embodiment 1 in that an inner surface 1h and a second regulating surface 24b are added. Components of the cover opening and closing device according to Embodiment 2 similar to those of the cover opening and closing device according to Embodiment 1 are denoted by the same reference numerals, and the detailed description thereof will not be repeated.

Figure 10A:
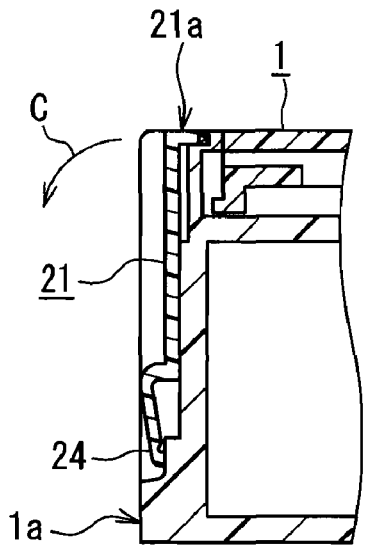
FIG. 10A is a cross-sectional view showing a main part of a cover opening and closing device according to Embodiment 2.
Figure 10B:
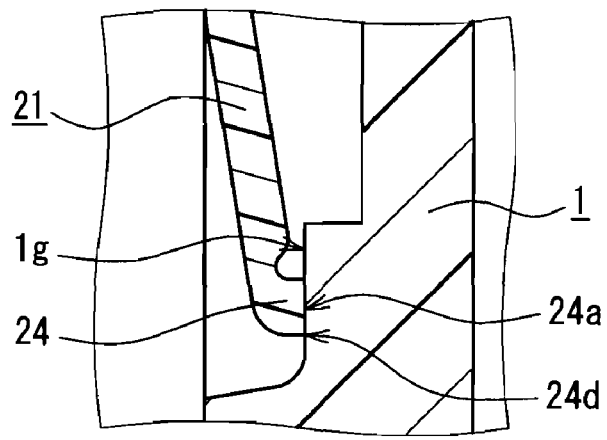
FIG. 10B is a cross-sectional view showing a main part in the vicinity of the turn regulating portion in FIG. 10A.

FIG. 10A is a cross-sectional view only showing a main part in the vicinity of the terminal cover 21 when the terminal cover 21 is at the cover closing position. FIG. 10B is a cross-sectional view showing a main part in the vicinity of the turning regulating portion 24 in FIG. 10A. As shown in FIG. 10B, when the terminal cover 21 is at the cover closing position, the first regulating surface 24a of the turn regulating portion 24 is in contact with the inner surface 1g of the cabinet 1. When turning the terminal cover 21 in the arrow C direction, the boundary portion 24d provided on the turn regulating portion 24 between the first regulating surface 24a and the third regulating surface 24c catches on the inner surface 1g of the cabinet 1. Thus, the terminal cover 21 is prevented, when it is closed as shown in FIG. 10A, from turning in the direction indicated by the arrow C by its own weight. In Embodiment 2, the concave portion 13 is formed in the cabinet 1 and the convex portion 27 is provided on the terminal cover 21, and the convex portion 27 engages with the concave portion 13 when the terminal cover 21 is at the cover opening position. Because of having such a configuration, it is possible to prevent the terminal cover 21 from turning in the direction indicated by the arrow C with more certainty when the terminal cover 21 is at the cover closing position.

To shift the terminal cover 21 from the closed state to the open state, a finger is placed on the upper end portion 21a of the terminal cover 21 shown in FIG. 10A and it is drawn in the direction indicated by the arrow C. The terminal cover 21 starts turning in the direction indicated by the arrow C while being supported by the coupling portions 22 and 23 (see FIG. 4).

Figure 11A:
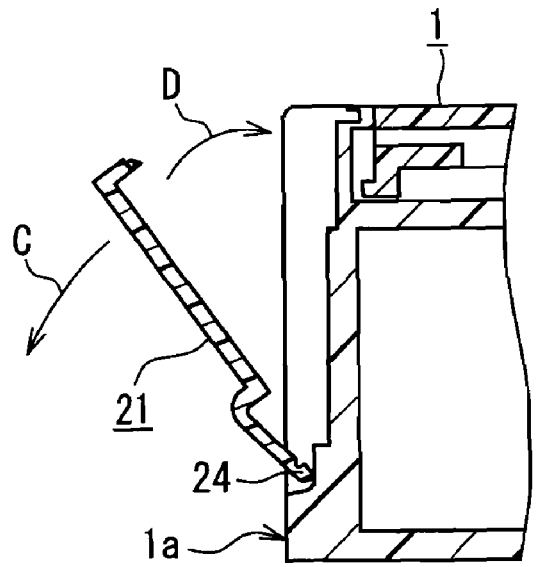
FIG. 11A is a cross-sectional view showing a main part of a card mounting apparatus in a state where a terminal cover is halfway open.
Figure 11B:
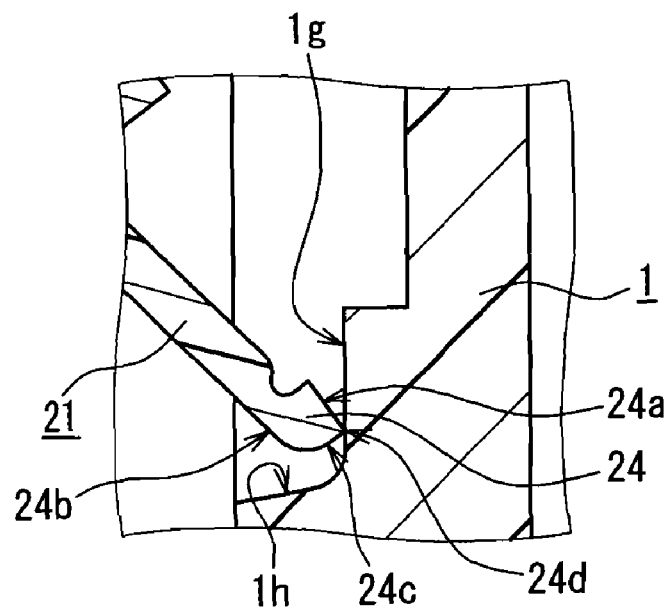
FIG. 11B is a cross-sectional view showing a main part in the vicinity of the turn regulating portion in FIG. 11A.

FIG. 11A is a cross-sectional view taken along a line Z-Z in FIG. 4, only showing a main part in the vicinity of the terminal cover 21 when the terminal cover 21 is at a position between the cover closing position and the cover opening position. FIG. 11B is a cross-sectional view showing a main part in the vicinity of the turn regulating portion 24 in FIG. 11A When the terminal cover 21 is turned to the position shown in FIG. 11A, the first regulating surface 24a of the turn regulating portion 24 and the inner surface 1g of the cabinet 1 become spaced from each other as shown in FIG. 11B. When the terminal cover 21 is turned further in the arrow C direction, the boundary portion 24d catches on the inner surface 1g of the cabinet 1. When the terminal cover 21 is turned further in the direction indicated by the arrow C, it reaches the state shown in FIG. 12A.

Figure 12A:
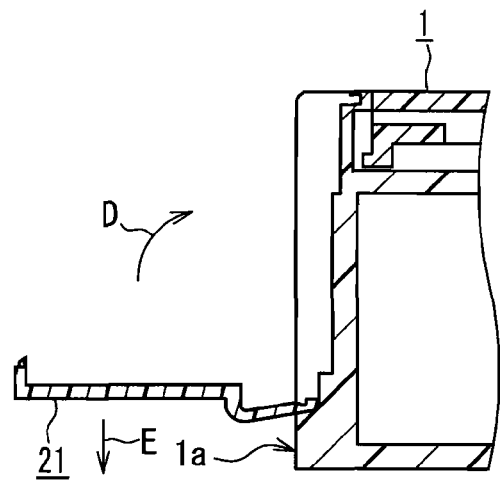
FIG. 12A is a cross-sectional view showing a main part of the cover opening and closing device according to Embodiment 2.
Figure 12B:
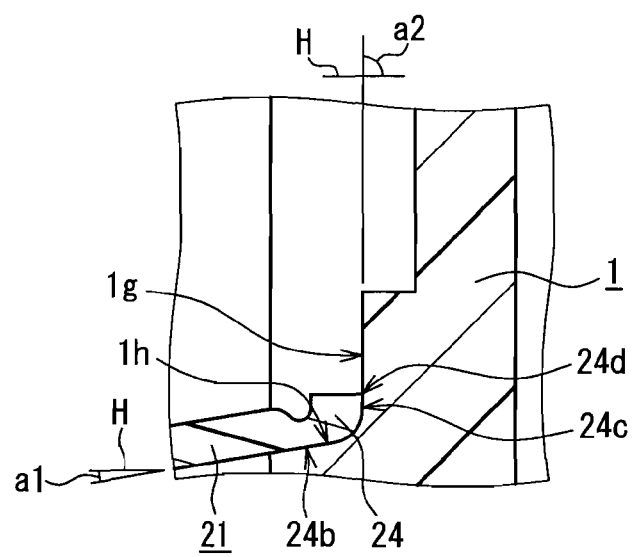
FIG. 12B is a cross-sectional view showing a main part in the vicinity of the turn regulating portion in FIG. 12A.

FIG. 12A is a cross-sectional view taken along a line Z-Z in FIG. 4, only showing the main part in the vicinity of the terminal cover 21 when the terminal cover 21 is at the cover opening position. FIG. 12B is a cross-sectional view showing the main part in the vicinity of the turn regulating portion 24 in FIG. 12A. As shown in FIG. 12B, when the terminal cover 21 is at the cover opening position, the second regulating surface 24b of the turn regulating portion 24 is in contact with the inner surface 1h of the cabinet 1. Consequently, the terminal cover 21 is prevented from turning in the direction indicated by the arrow E. Further, when the terminal cover 21 is at the cover opening position, the third regulating surface 24c of the turn regulating portion 24 is in contact with the inner surface 1c of the cabinet 1. Consequently, the terminal cover 21 is prevented from turning in the direction indicated by the arrow D, and the terminal cover 21 can be fixed at the cover opening position. At this time, resilience in the direction indicated by the arrow D which forces the coupling portions 22 and 23 to return to their original shapes (see FIG. 12A) develops in the coupling portions 22 and 23. However, since the third regulating surface 24c is in contact with the inner surface 1c and the boundary portion 24d has to catch on the inner surface 1g to turn the terminal cover 21 in the direction indicated by the arrow D, it is possible to prevent the terminal cover 21 from turning in the direction indicated by the arrow D.

When the terminal cover 21 is open as shown in FIGS. 12A and 12B, a user can attach/detach a serial cable to/from the serial terminal 25 (see FIG. 4) or attach/detach a LAN cable to/from the LAN terminal 26 (see FIG. 4). At this time, the terminal cover 21 is fixed in the open state where the terminals are fully open. Thus, the terminal cover 21 does not hinder the user from connecting a cable to one of the terminals, so that the cable can be attached/detached to/from the terminal with ease.

Figure 12C:
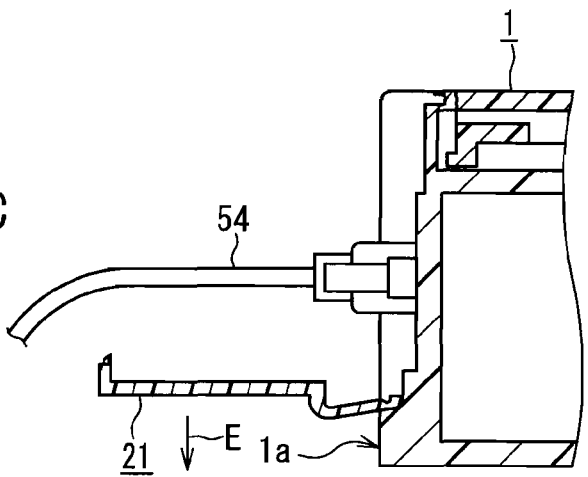
FIG. 12C is a cross-sectional view showing a main part in a state where a cable is connected.

FIG. 12C is a cross-sectional view showing a main part in a state where the serial cable 54 is connected to the serial terminal 25 (see FIG. 4). As shown in FIG. 12C, in the state where the serial cable 54 is connected to the serial terminal 25 (see FIG. 4) provided on the cabinet 1, the serial cable 54 and the terminal cover 21 are spaced from each other. Thus, the serial cable 54 can be easily removed from the serial terminal 25 (see FIG. 4). Further, in the state where the serial cable 54 is connected to the serial terminal 25 (see FIG. 4), a load is not applied to the serial cable 54 from directions other than the attaching/detaching directions. Thus, it is possible to prevent the occurrence of poor connection between the terminal and the cable.

When shifting the terminal cover 21 from the open state shown in FIGS. 12A and 12B to the closed state, the terminal cover 21 is turned in the direction indicated by the arrow D from the state shown in FIGS. 12A and 12B. At this time, since the third regulating surface 24c of the turn regulating portion 24 is in contact with the inner surface 1g of the cabinet 1, a turning load develops. However, when the terminal cover 21 is turned to a predetermined angle, the third regulating surface 24c slightly and elastically deforms, and thereby the terminal cover 21 can be shifted to the state shown in FIGS. 11A and 11B.

By further turning the terminal cover 21 in the direction indicated by the arrow D from the state shown in FIGS. 11A and 11B to move the terminal cover 21 to the position shown in FIGS. 10A and 10B, the serial terminal 25 and the LAN terminal 26 (see FIG. 4) can be covered with the terminal cover 21. At this time, the first regulating surface 24a of the turn regulating portion 24 is in contact with the inner surface 1g of the cabinet 1. Thus, in the closed cover state shown in FIG. 10A, the terminal cover 21 is prevented from turning in the direction indicated by the arrow C by its own weight.

Furthermore, by engaging the convex portion 27 (see FIG. 4) with the concave portion 13 (see FIG. 4) of the cabinet 1, the terminal cover 21 can be fixed at the cover closing position.

According to the cover opening and closing device according to Embodiment 2, as a result of providing the turn regulating portion 24 on the terminal cover 21, the terminal cover 21 can be prevented from turning in the cover closing direction by the resilience of the coupling portions 22 and 23 when the terminal cover 21 is moved to the cover opening position. Thus, when connecting a cable to one of the terminals, the terminal cover 21 does not hinder a user from connecting the cable. As a result, it is possible to connect the cable to the terminal with ease.

Further, since there is no need for the cover opening and closing device to include separate components such as a leaf spring and a stopper to fix the terminal cover 21 at the cover opening position, it can be achieved from a small number of components at low cost.

Further, as shown in FIG. 12C, since the terminal cover 21 is apart from the cable in the state where the cable is connected to the terminal, a load is not applied to the cable. As a result, it is possible to prevent the occurrence of poor connection between the terminal and the cable, for example. Furthermore, there is also an advantage that the cable can be easily removed from the terminal.

Further, since the second regulating surface 24b of the turn regulating portion 24 comes into contact with the inner surface 1h of the cabinet 1 when the terminal cover 21 is at the cover opening position, it is possible to prevent the terminal cover 21 from further turning in the cover opening direction (direction indicated by the arrow E from the cover opening position shown in FIG. 12C) from the cover opening position. Thus, it is possible to prevent the occurrence of breakage such as the coupling portions 22 and 23 being ruptured.

Further, since the first regulating surface 24a of the turn regulating portion 24 comes into contact with the inner surface 1g of the cabinet 1 when the terminal cover 21 is at the cover closing position, it is possible to prevent the terminal cover 21 from turning in the cover opening direction by its own weight. Consequently, since the terminal cover 21 does not open unexpectedly, it is possible to prevent the adherence of foreign matters, such as moisture and dust, to the terminals that the terminal cover 21 can cover.

Although the terminal cover 21 can cover the serial terminal 25 and the LAN terminal 26 in Embodiment 2, these terminals are examples. The terminals that the terminal cover 21 can cover may be a USB terminal to which a USB cable can be connected and a power terminal to which a power cable can be connected.

Although the terminal cover 21 capable of covering terminals has been described as an example of the cover of the present invention, the portion to be covered with the cover is not limited to terminals. Even when the portion to be covered is a memory card slot to/from which a memory card can be attached/detached or a battery slot to/from which a battery can be attached/detached, effects similar to those in Embodiment 2 can be achieved.

Further, by adjusting the angle of the inner surfaces 1g and 1h of the cabinet 1 and the angle of the surfaces of the terminal cover 21 that respectively come into contact with the inner surfaces 1g and 1h when opening the cover, the cover opening angle when the terminal cover 21 is at the cover opening position can be adjusted to any given angle. That is, a line segment H in FIG. 12B is parallel to the upper surface 1a of the cabinet 1. By setting an angle a1 of the inner surface 1h relative to the line segment H and the angle a2 of the inner surface 1g relative to the line segment H to any given angles, the cover opening angle of the terminal cover 21 can be set to any given angle. By increasing the angles a1 and a2, the cover opening angle of the terminal cover 21 can be increased. Further, by reducing the angles a1 and a2, the cover opening angle of the terminal cover 21 can be reduced.

The terminal cover 21 in Embodiments 1 and 2 is an example of the cover of the present invention. The cabinet 1 in Embodiments 1 and 2 is an example of the cabinet of the present invention. The turn regulating portion 24 in Embodiments 1 and 2 is an example of the turn regulating portion of the present invention. The first regulating surface 24a in Embodiments 1 and 2 is an example of the cover opening regulating surface of the present invention. The third regulating surface 24c in Embodiments 1 and 2 is an example of the cover closing regulating surface of the present invention. The serial terminal 25 and the LAN terminal 26 in Embodiments 1 and 2 are examples of the portion to be covered of the present invention. The boundary portion 24d in Embodiments 1 and 2 is an example of the boundary portion of the present invention.

The present invention is useful as a cover opening and closing device capable of opening and closing terminals.

With respect to the present embodiment, the following appendixes will be disclosed.

[Appendix 1]

A cover opening and closing device comprising:

a cabinet; and a cover turnably supported against the cabinet and capable of opening and closing a portion of the cabinet to be covered, wherein the cover includes a turn regulating portion capable of preventing the cover, when the cover is at a position for opening the portion to be covered, from turning in a cover closing direction.

[Appendix 2]

The cover opening and closing device according to Appendix 1, wherein the turn regulating portion is formed integrally with the cover.

[Appendix 3]

The cover opening and closing device according to Appendix 1, wherein the turn regulating portion includes a cover closing regulating surface that, when the cover is at the position for opening the portion to be covered, comes into surface-to-surface contact with a surface of the cabinet so as to prevent the cover from turning in the cover closing direction.

[Appendix 4]

The cover opening and closing device according to Appendix 1, wherein the turn regulating portion includes a cover opening regulating surface that, when the cover is at a position for closing the portion to be covered, comes into surface-to-surface contact with a surface of the cabinet so as to prevent the cover from turning in a cover opening direction.

[Appendix 5]

The cover opening and closing device according to Appendix 1, wherein the turn regulating portion includes:

a cover closing regulating surface that, when the cover is at the position for opening the portion to be covered, comes into surface-to-surface contact with a surface of the cabinet so as to prevent the cover from turning in the cover closing direction;

a cover opening regulating surface that, when the cover is at a position for closing the portion to be covered, comes into surface-to-surface contact with the surface of the cabinet so as to prevent the cover from turning in a cover opening direction; and a convex boundary portion formed between the cover closing regulating surface and the cover opening regulating surface.

[Appendix 6]

The cover opening and closing device according to Appendix 1, wherein the portion to be covered is provided with a terminal to which a communication cable can be connected, and an opening angle of the cover relative to the cabinet when the cover is at the position for opening the portion to be covered is an angle that allows a space between the cover and the communication cable connected to the terminal.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A cover opening and closing device comprising:

a cabinet; and a cover turnably supported against the cabinet and capable of opening and closing a portion of the cabinet to be covered, wherein the cover includes a turn regulating portion capable of preventing the cover, when the cover is at a position for opening the portion to be covered, from direction, wherein the turn regulating portion is formed integrally with the cover turning in a cover closing.

2. The cover opening and closing device according to claim 1, wherein the turn regulating portion includes a cover closing regulating surface that, when the cover is at the position for opening the portion to be covered, comes into surface-to-surface contact with a surface of the cabinet so as to prevent the cover from turning in the cover closing direction.

3. The cover opening and closing device according to claim 1, wherein the turn regulating portion includes a cover opening regulating surface that, when the cover is at a position for closing the portion to be covered, comes into surface-to-surface contact with a surface of the cabinet so as to prevent the cover from turning in a cover opening direction.

4. The cover opening and closing device according to claim 1, wherein the turn regulating portion includes:

a cover closing regulating surface that, when the cover is at the position for opening the portion to be covered, comes into surface-to-surface contact with a surface of the cabinet so as to prevent the cover from turning in the cover closing direction;

a cover opening regulating surface that, when the cover is at a position for closing the portion to be covered, comes into surface-to-surface contact with the surface of the cabinet so as to prevent the cover from turning in a cover opening direction; and a convex boundary portion formed between the cover closing regulating surface and the cover opening regulating surface.

5. The cover opening and closing device according to claim 1, wherein the portion to be covered is provided with a terminal to which a communication cable can be connected, and an opening angle of the cover relative to the cabinet when the cover is at the position for opening the portion to be covered is an angle that allows a space between the cover and the communication cable connected to the terminal.

* * * * *